United States Patent [19]
Brusky et al.

[11] Patent Number: 6,111,569
[45] Date of Patent: Aug. 29, 2000

[54] COMPUTER-BASED UNIVERSAL REMOTE CONTROL SYSTEM

[75] Inventors: Kevin J. Brusky, Magnolia; John W. Frederick, Spring, both of Tex.

[73] Assignee: Compaq Computer Corporation, Houston, Tex.

[21] Appl. No.: 08/804,750

[22] Filed: Feb. 21, 1997

[51] Int. Cl.⁷ ...................................................... G06F 3/00
[52] U.S. Cl. .................. 345/327; 211/26.1; 341/176; 348/734
[58] Field of Search ........................... 211/26.1; 294/905; 341/176; 348/734; 455/151.1, 352, 419, 420; 379/102.01, 102.02, 102.3; 955/92; 345/327, 339, 970, 961

[56] References Cited

U.S. PATENT DOCUMENTS

| | | | |
|---|---|---|---|
| 4,718,112 | 1/1988 | Shinoda | ................................ 455/151.4 |
| 4,841,132 | 6/1989 | Kajitani et al. | ......................... 235/472 |
| 5,109,222 | 4/1992 | Walty | .................................. 340/825.72 |
| 5,313,282 | 5/1994 | Hayashi | ................................... 348/729 |
| 5,414,761 | 5/1995 | Darbee | .................................. 379/102.01 |
| 5,724,106 | 3/1998 | Autry et al. | ............................. 348/734 |
| 5,748,263 | 5/1998 | Ball | ........................................ 348/734 |

OTHER PUBLICATIONS

Ciarua, S., "Build an enfrared remote Controller," BYTE, vol. 12, No. 2, pp. 101–110, Feb. 1987.

Muller, J., "Remote operation of home receivers", Radio Fernsehen Elektronik, vol. 26, No. 14, pp. 475–477, 1977.

*Primary Examiner*—A. Katbab
*Attorney, Agent, or Firm*—Jenkens & Gilchrist, P.C.

[57] ABSTRACT

A programmable remote control is implemented using a standard personal computer. The computer controls the output of, for example, an infrared transmitter to control various devices such as televisions, stereos, videocassette recorders or cd players. The computer can alter the type of commands issued from the transmitter based upon a command structure stored on a hard disk within the computer. This database is updatable from a variety of sources.

10 Claims, 2 Drawing Sheets

COMPUTER-BASED UNIVERSAL REMOTE CONTROL SYSTEM

BACKGROUND OF THE INVENTION

1. Field of the Invention

This invention relates generally to the field of wireless communication devices. More particularly, this invention relates to a method of improving the functionality of universal remote controls for consumer electronic devices. An example of such a control is a universal remote for televisions, stereos, CD players and the like.

2. Description of the Related Art

Various universal remote controls have been proposed by others. However, the degree of acceptance and functionality of these devices has been limited in that they normally require complex user interaction for reprogramming or for use with multiple devices. These universal remotes are generally a single device that can be programmed to control one type of multiple electronic device such as a type of VCR, type of TV, type of laser disc player, type of stereo or the like; or they are designed to operate generally one VCR, one TV, one stereo or the like. Generally, these universal remotes have internal databases which are stored in ROM 90 of several different devices in each class. The number of these types are limited and may only be in the tens or at most a few hundred devices.

SUMMARY OF THE INVENTION

This invention solves some of the problems of conventional prior art universal remotes by having the capability of having an enlarged database of possible devices which can be controlled. As an additional benefit of this enlarged database and the mechanism for use, this database is stored on a hard disk of a personal computer, providing for easier addition of new types of devices to control and of specific models of devices which are to be controlled. Further, it is possible to easily add new means for the communication link to occur between the remote control and the device to be controlled. In the past, almost all devices have used an infrared link. However, as the number of devices which are controlled by remote device increase, it is probable that infrared controls will become more cumbersome and accordingly it may be advisable to use radio frequency, sonic or other types of communication links to the device to be controlled. Alternatively, it may be advisable to use a mix of links.

Yet another advantage of the architecture of this invention is there is "a longer life span" for the remote device as the functionality can be upgraded by a simple software upgrade (i.e. such as by popping in a floppy disk into the computer). Yet another advantage is the ability to "macro program" the device so that a plurality of additional functions can be accomplished by a single command from the user.

Yet another object of this invention is to provide a database that is more comprehensive than prior art databases. As most prior art systems use a database which is stored in ROM which is of limited size as opposed to a fixed disk such as the type that is used in a personal computer, the size constraints of conventional remote controls is eliminated in this invention. Furthermore, because of reliance on limited ROM databases, most prior art systems have to make decisions as to which types of devices and the number of devices which will be included in the internal stored database and the ROM. This results in user frustration because some devices that the user may have may not be fully supported or may not be supported at all by the universal remote. This problem is ameliorated in this invention.

A further advantage of this invention is that in most universal remote controls only a limited number of devices of a given type may be accessed by the universal remote. For example, if a VCR is selected most prior art universal remotes will only support a single VCR, or at most, two VCRs. This invention allows support of a virtually unlimited number of devices (the number is limited only by the size of the user's hard disk in his computer) Accordingly, the user may readily control a plethora of devices, or a plethora of devices of the same device type but using different device codes. Further, systems constructed according to the teachings of the present invention may be upgraded for new device types which may not even be on the market at the time that the remote is initially marketed by using the simple software upgrade path.

Further, by having the device connected to the computer and as part of the computer, the computer may be used to provide additional functionality, such as timing control, automatic selection of programming, the switching of channels, channel lockout, parental control or the like.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE PREFERRED EXEMPLARY EMBODIMENT OF THE PRESENT INVENTION

Figure 1:
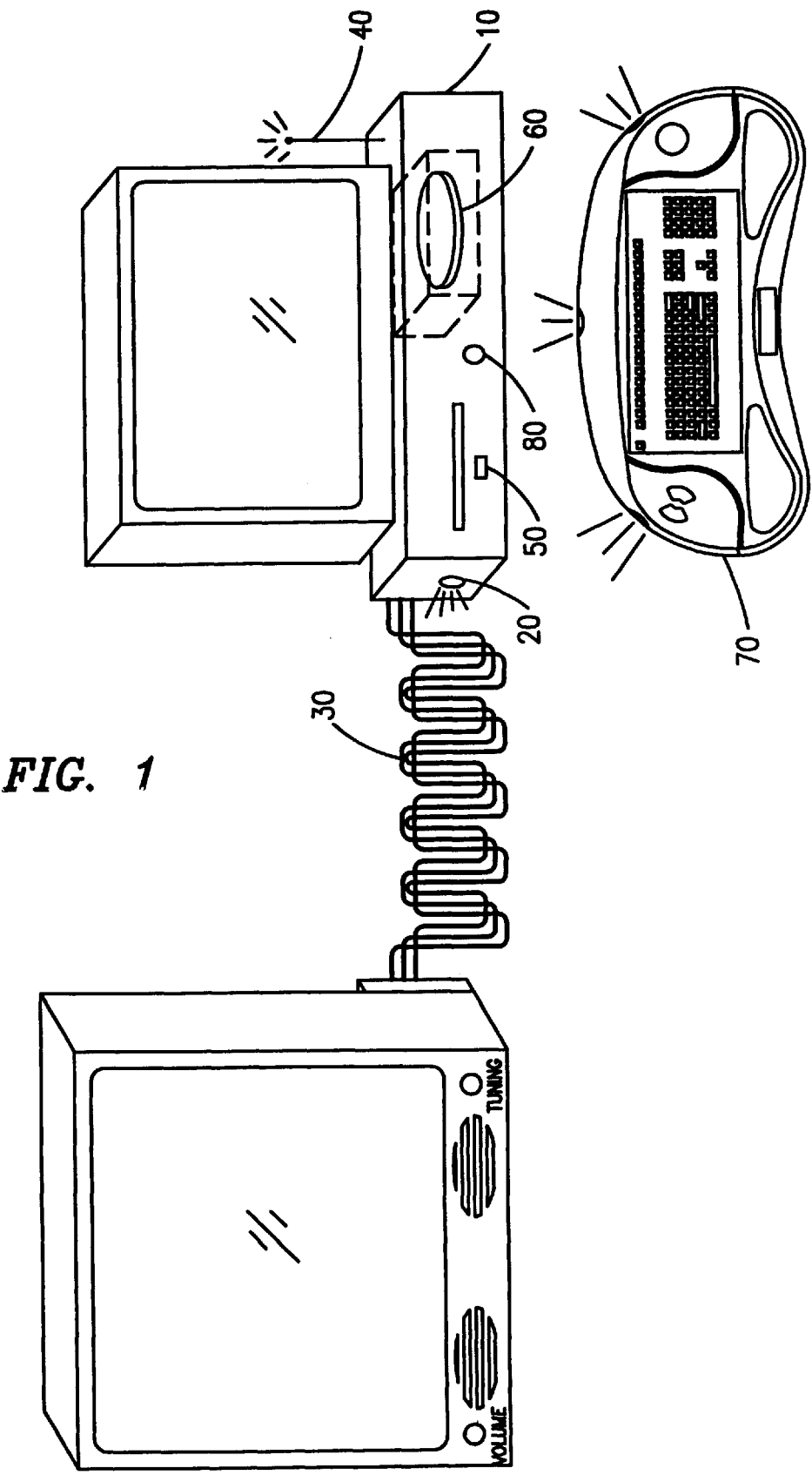
FIG. 1 is a block diagram of the structure of this invention.
Figure 2:
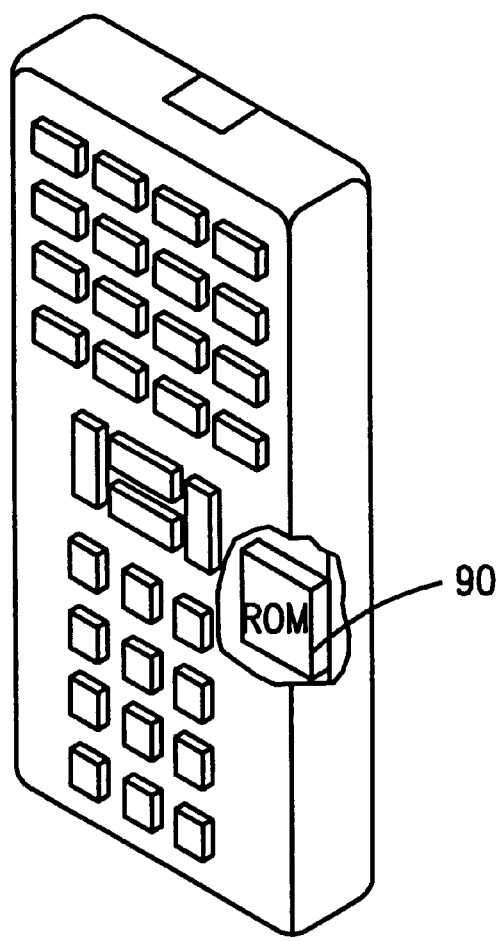
FIG. 2 is an exemplary drawing of the conventional type of universal remote control.

Referring now to the drawings wherein like or similar elements are designated with identical reference numerals throughout the several views, and wherein the various elements depicted are not necessarily drawn to scale, and, in particular, to FIG. 1, there is shown a personal computer 10 having an infrared transmitting device 20. Also shown in FIG. 1 is a television type receiver that is connected to the personal computer by means of a communication link 30 such as a I$^2$C link. Via either the infrared transmitting device 20 set or the I$^2$C link, for example, commands can be sent to the television. Additionally, commands can be sent from the infrared transmitter 20 to other devices by using a separate infrared transmitter or the same transmitter. Further, an RF transmitter 40 can be added. A microcontroller 50 can also be connected via either an I$^2$C or an RS232 interface to the computer. This microcontroller can convert digital commands into an infrared light stream which can be transmitted via the IR transmitter 20. Optionally an infrared receiver 80 can be provided so as to "learn additional various codes" by conventional methods.

However, as the "system" described above (i.e., the personal computer 10) is software controlled, it is likely that a user will prefer updating the database stored on the hard disk 60 by way of a software control either through a download mechanism or through a floppy diskette update. Such an update can include new types of commands which will be accepted by various devices. This provides a "plug and play" type of environment.

The software necessary to control the infrared command generation by the computer is a function of the specific design of the system. However, using a conventional Windows-based system, a series of commands and a blaster type of service protocol has been provided in this invention. A simple command structure accessing a database of commands is possible. By having a database lookup, a menu based system can be provided so that a selection using either a point and click or the pressing of a desired function on either a separate wired remote control or a wireless remote control that is associated with the personal computer will accomplish the appropriate transmission of the infrared command from and to the device. This, of course, implies that a command is initially entered by a user; for example, from something such as a wireless keyboard 70, which is received by the computer and then retranslated or used to execute a series of commands which will then generate, via the infrared transmitter at the computer, the appropriate commands to the device which the user intends to control. By having the computer control this and by using simple software commands, a "macro type function" of Applicants' invention can be implemented. For example, a command can be issued which is a "chaining" of commands which could be, for example, "turn VCR on," "turn cable box on," "change cable box to channel X," "put VCR in record mode," "record for X number of minutes," "change cable box to channel Y," "record for X number of minutes . . . ," and so on.

Due to the potential power of this type of device, simplification of the user interface has been accomplished. As ordinary users who may not be fully computer literate may use this type of device, a simplified interface is provided to the user. For example, an exemplary remote control may have a far greater number of buttons or keys than a conventional universal remote. This exemplary remote may be like a full blown computer keyboard 70 with additional keys added, such as a video mode key, a rewind play, fast forward, record, stop, pause, etc., wherein new "types" of keys can be added to the keyboard. Also, or alternatively, the exemplary remote may allow use of a menuing system, which is called up by a function key on the keyboard, on the computer screen. Furthermore, track ball or mouse support may also be provided for the selection of individual commands to be executed. This keyboard type of system may be an infrared wireless keyboard 70 such as is shown in FIG. 1 or it may be wired (not shown).

The only additional software that is required by this invention is a control driver which will receive input from the keyboard driver to receive the variety of system codes which might occur, and to translate those codes into the proper remote control function codes using a calling routine from a database which will select the device type and device code and the specific command necessary to operate the specific device.

An additional feature of this invention is an embodiment in which a connection to the Internet or some other type of online services is provided. In this embodiment, information as to specific programming information can be obtained. Using this programming information the computer can do a lookup and use this information to provide control to the infrared device to be operated.

Although a few preferred embodiments of the invention have been shown and described, it can be readily appreciated by those skilled in the art that changes may be made from this embodiment without departing from either the principles or the spirit of this invention and this invention should only be limited in scope by what is defined by the appended claims.

What is claimed is:

1. A computer-based system for the remote control of at least one separate electronic device, the computer-based system comprising:

a central processing unit;

an infrared transmitter coupled to said central processing unit, said infrared transmitter configured to transmit one or more commands; and a mass storage device coupled to said central processing unit wherein said mass storage device contains software configured to provide instructions to said central processing unit which cause said central processing unit to direct that said infrared transmitter transmit one or more commands to said at least one separate electronic device, said one or more commands providing remote control of said at least one separate electronic device.

2. A system as in claim 1, further comprising a database of commands for a plurality of electronic devices within said mass storage device.

3. A system as in claim 2, further comprising:

means to receive infrared commands; and means to add a digital representation of said commands into said database.

4. A system as in claim 2, further comprising:

means to update said database.

5. A system as in claim 2, further comprising:

means to display and edit stored commands on a display device.

6. A system as in claim 5, wherein said display device is a television or computer monitor.

7. A system as in claim 2, further comprising:

a user input device for selecting commands to be executed.

8. A system as in claim 7, wherein said user input device comprises:

a mouse.

9. A system as in claim 7, wherein said user input device comprises:

a hand held unit have a plurality of software controllable keys wherein said software is stored in said mass storage device.

10. A system as in claim 2, wherein said database comprises at least a power on/off command for at least two devices, and wherein said commands are transmitted in response to a single software selection of a power all down command.

* * * * *